United States Patent [19]

Yoshida et al.

[11] Patent Number: 4,588,869
[45] Date of Patent: May 13, 1986

[54] METHOD FOR RELIEVING RESIDUAL STRESSES BY CONTROLLING WELD HEAT INPUT

[75] Inventors: Kazuo Yoshida; Tadahiro Umemoto, both of Yokohama, Japan

[73] Assignee: Ishikawajima-Harima Jukogyo Kabushiki Kaisha, Tokyo, Japan

[21] Appl. No.: 583,427

[22] Filed: Feb. 24, 1984

[30] Foreign Application Priority Data

Feb. 28, 1983 [JP] Japan .................................. 58-32541

[51] Int. Cl.⁴ .............................................. B23K 9/04
[52] U.S. Cl. .................... 219/76.14; 219/76.1
[58] Field of Search ................. 219/76.1, 76.12, 76.14

[56] References Cited

FOREIGN PATENT DOCUMENTS 33193 4/1981 Japan .................................. 219/76.1

Primary Examiner—C. L. Albritton
Assistant Examiner—C. M. Sigda

[57] ABSTRACT

A welding machine is used to heat the outer surface of a butt welded joint of pipe sections such that the weld heat input condition $q/t^2$ (where q: heat input and t: the thickness of the wall of a pipe) is higher than approximately 0.01 and the relative heat transfer coefficient $ht/\lambda$ (where h: the heat transfer coefficient between a coolant and the inner surface of a pipe and $\lambda$: the thermal conductivity of a pipe) is higher than approximately 2, whereby the residual stresses at the inner surface of the weld can be relieved by utilizing the temperature difference between the outer and inner surfaces of the pipe.

3 Claims, 8 Drawing Figures

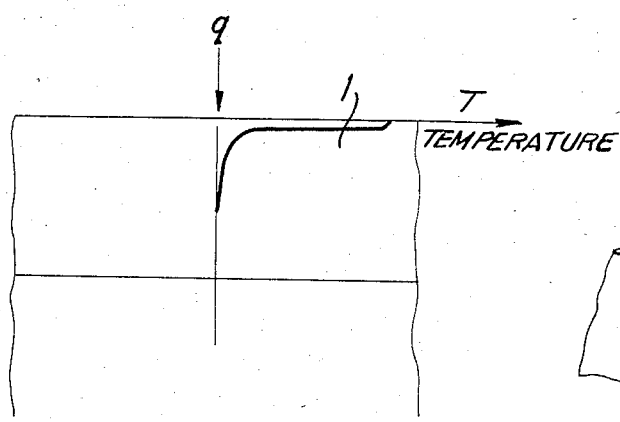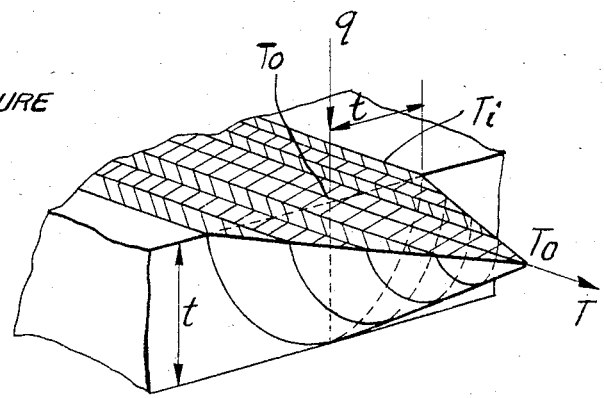
FIG.1   FIG.2
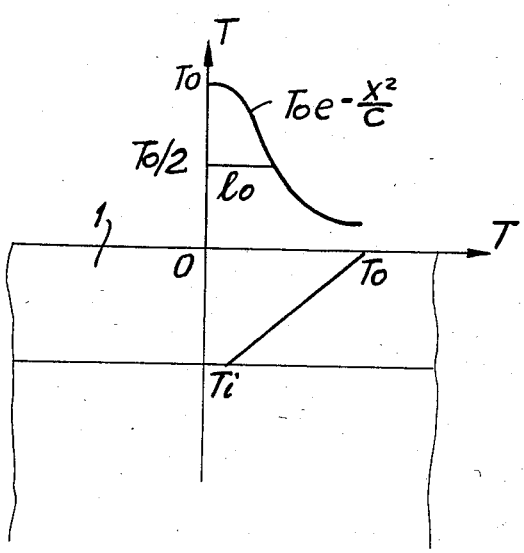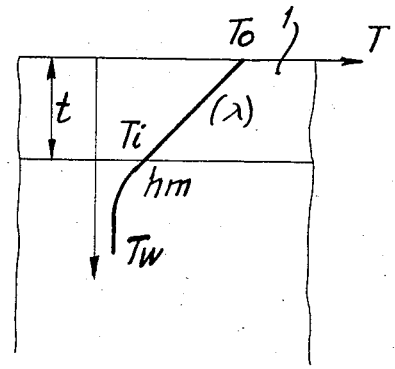
FIG.3   FIG.4

METHOD FOR RELIEVING RESIDUAL STRESSES BY CONTROLLING WELD HEAT INPUT

BACKGROUND OF THE INVENTION

The present invention relates to a method for relieving residual stresses in the inner surface of a weld by heating the outer surface of a butt welded joint between pipe sections by a welding machine under predetermined conditions and by utilizing the temperature difference between the outer and inner surfaces of the pipe sections.

When pipe sections are butt welded, high tensile residual stresses are left in the weld and the heat affected zone. If the residual stresses are not relieved, stress corrosion cracking results so that in the cases of pipes and cylindrical or tubular vessels used in nuclear reactors, chemical plants or the like, there exists a fear that a serious accident will happen. Therefore, the residual stresses must be relieved. Generally, the welded joints are subjected to such heat treatments that the tensile residual stresses in the inner surfaces of the weld and the heat affected zone are relieved or converted into the compressive residual stresses.

There are various methods for relieving the residual stresses by utilizing the temperature difference between the inner and outer surfaces of a welded pipe. They are, for instance, a high frequency heating process and the Linde process (for heating the outer surfaces of a welded pipe by flames). The high frequency heating process requires a large-sized device, and a high frequency induction coil must be fabricated for each pipe so that the high frequency heating process is expensive. Furthermore the high frequency heating process requires many days. According to the Linde process, it is technically difficult to produce stably residual stresses in the inner surface of a welded pipe in a stable manner.

Neither the high frequency heating process nor the Linde process can provide satisfactory conditions for relieving the residual stresses. Both processes are carried out based on experience so that satisfactory stress relief cannot be accomplished.

In view of the above, the present invention provides a method for relieving the residual stresses at a welded joint in a simple yet very positive manner. According to the present invention, a welding machine such as a TIG welding machine, a MIG welding machine, a plasma arc welding machine or the like is used so that weld heat input is so controlled that a local temperature gradient for relieving the residual stresses can be developed.

BRIEF DESCRIPTION OF THE DRAWINGS

FIG. 1 is a view used to explain the heating condition when the weld heat input is low;

FIG. 2 is a view used to explain the heating condition when the weld heat input is high;

FIG. 3 shows a temperature distribution when the weld heat input is high;

FIG. 4 shows a one-dimensional temperature distribution;

DETAILED DESCRIPTION OF THE EMBODIMENTS

Figure 5:
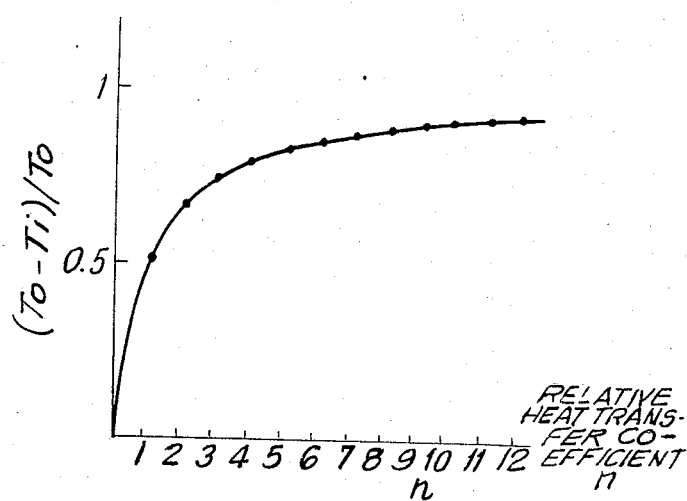
FIG. 5 is a graph showing the relationship between the relative heat transfer coefficient n and $(T_o - T_i)/T_o$.

When the weld heat input q is low, a pipe 1 is heated as shown in FIG. 1. That is, a heated portion is very limited and the shrinking force after cooling is low. When the weld heat input q is high, the pipe is heated as shown in FIG. 2. That is, substantial portion of the wall of the pipe 1 is raised to a high temperature. One half of the wall of the pipe is raised to a temperature higher than an average temperature while the remaining half portion of the pipe wall is raised to a temperature lower than the average temperature. In this case, the shrinking force which appears after cooling is considered to be developed in the portion whose temperature is higher than the average temperature; that is, one half portion of the pipe wall. The portion in which the shrinking force is developed is by far greater than that portion when the welding heat input is low. As a result, the resulting residual stress is higher than that produced when the weld heat input is low.

In order to estimate the heat input required for sufficient residual stresses, it is assumed that the temperature distribution in the wall of the pipe 1 is a circle whose center coincides with a weld line (heating line) (See FIG. 2). In this case, the weld heat input q is obtained by multiplying the volume of a semi-cone as shown in FIG. 2 by a specific gravity and a specific heat. That is, the weld heat input q is given by $$q = \frac{1}{2} \times \frac{1}{3} \pi \times t^2 (T_o - T_i) \mu \cdot \rho \qquad (1)$$

$$q/t^2 \simeq 0.5 \cdot T_o \cdot \mu \cdot \rho$$

where
- t: the wall thickness of a pipe,
- $T_o$: the recrystallization temperature of a work material,
- $T_i$: the temperature of the inner surface of a pipe,
- $\mu$: specific heat, and
- $\rho$: specific gravity.

The reason why $T_o$ i.e. the recrystallization temperature of a work material is employed is as follows. The strength of a work material is extremely low at a temperature higher than a recrystallization temperature so that even when stains are produced, stresses are almost not developed. Furthermore even when stresses are developed, they are relieved because of high temperature. That is, it is assumed that the temperature variation after the maximum temperature of the pipe wall has been cooled to a recrystallization temperature greatly influences the residual stresses.

Eq. (1) is one of the necessary conditions for increasing the compressive force. In Eq. (1), $T_o$, $\mu$ and $\rho$ are material constants so that one of the major parameters is that the value of $q/t^2$ is greater than the right term of Eq. (1).

If the above described assumptions are held, the temperature $T_o$ is distributed at the point O in the axial direction and in the direction of thickness of a plate. Therefore when the temperature drops to room temperature, the residual stress is the axial stress given by thermoelastic analysis as $$\sigma_{aq} = \left[ 1.816F(l_o\beta) - \frac{l_o\beta}{2(1-\nu)} \cdot \frac{T_o - T_i}{T_a} \right] \times E\alpha T_a \quad (2)$$

where
$\beta^4 = 3(1-\nu^2)/a^2t^2$
$l_o$: the distance over which the temperature of the outer surface of a pipe is $T_o/2$,
$\nu$: poisson's ratio,
E: Young's modulous,
a: radius of the pipe,
$\alpha$: the coefficient of linear expansion,
$T_a = (T_o + T_i)/2$, $$F = \left(\frac{1}{l_o\beta}\right)^2 / \left(1 + \frac{1}{l_o\beta}\right) \left[1 + \left(\frac{1}{l_o\beta}\right)^2\right]$$

In Eq. (2), the first term represents the stress due to the temperature distribution in the axial direction while the second term represents the stress due to the temperature distribution in the direction of thickness. In order to make the residual stress $\sigma_{aq}$ negative (compressive stress), $(T_o - T_i)$ must be made greater. Therefore a parameter which makes $(T_o - T_i)$ greater will be discussed. From the simple one-dimensional model as shown in FIG. 4, $$\lambda \frac{T_o - T_i}{t} = h(T_i - T_w) \quad (3)$$

where
$\lambda$: the thermal conductivity,
h: the heat transfer coefficient between a coolant in a pipe and the inner surface of the pipe,
$T_w$: the temperature of the coolant.
Since $T_o >> T_w$ $$\frac{T_o - T_i}{T_o} = \frac{n}{n+1} \quad (4)$$

$$\text{where } n = \frac{ht}{\lambda} \quad (5)$$

n defines the relative heat transfer coefficient.

FIG. 5 shows the relationship between the relative heat transfer coefficient n and $(T_o - T_i)/T_o$. It has seen that in order to increase $(T_o - T_i)/T_o$ the relative heat transfer coefficient n must be increased. That is, the relative heat transfer coefficient n must be increased or the wall thickness t of a pipe must be increased.

From the above described explanation, it is apparent that in order to develop the residual stresses by applying the weld heat input and then to relieve the residual stresses at the weld, the heat input condition $q/t^2$ and the relative heat transfer coefficient n (cooling condition) must be appropriately determined in welding.

Figure 6:
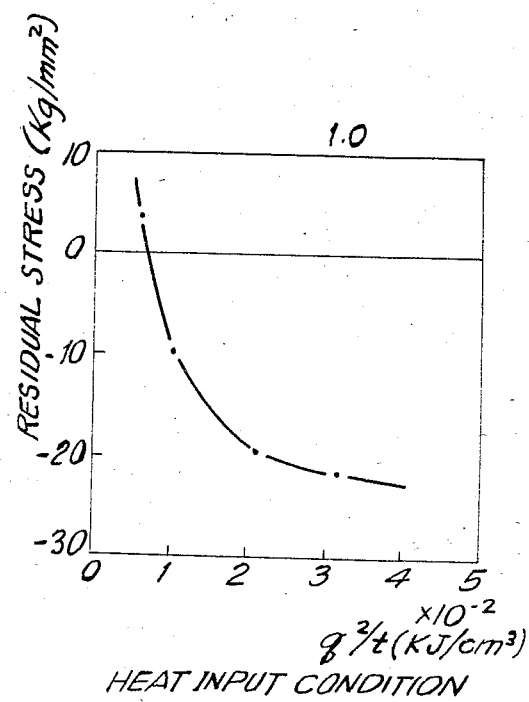
FIG. 6 is a graph showing the relationship between the heating condition and the residual stress.

FIG. 6 shows the relationship between the heat input condition $q/t^2$ (KJ/cm$^3$) and the residual stress (kg/mm$^2$). It is seen that when the heat input condition $q/t^2$ is higher than approximate 0.01, the compressive residual stress sufficient to relieve the tensile residual stress in the weld can be developed.

Figure 7:
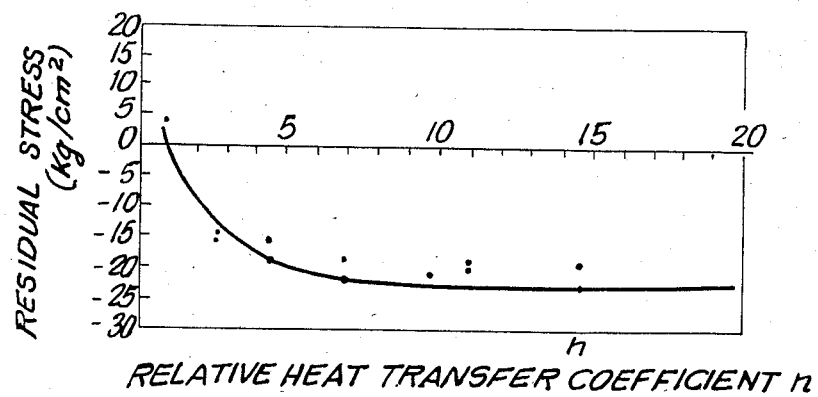
FIG. 7 is a graph showing the relationship between the relative heat transfer coefficient and the residual stress.

FIG. 7 shows the relationship between the relative heat transfer coefficient n and the residual stress. It is seen that a sufficient compressive residual stress can be developed when the relative heat transfer coefficient is more than approximate 2.

It follows therefore that when a weld is heated under the heat input condition $q/t^2 \gtrsim 0.01$ and the cooling condition such that the relative heat transfer coefficient $n \gtrsim 2$, the residual stresses can be relieved.

Figure 8:
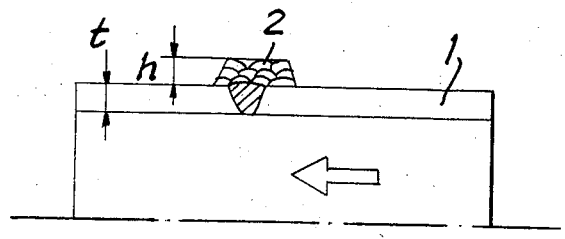
FIG. 8 is a view used to explain a modification of the present invention.

So far the weld heat input in the case of TIG welding etc. which will not accomplish build-up welding has been described. But when heat is applied by build-up welding as shown in FIG. 8, t in Eq. (5) must be changed to (t+h'), where h' is the height of the build-up welded portion 2.

The coolant, which is one of the parameters of the cooling conditions, is not limited to the air, water or the like and it suffices that the relative heat transfer coefficient is higher than approximate 2 in consideration of the wall thickness t.

As described above, according to the present invention, the residual stresses in the butt welded joint between pipe sections or cylindrical vessels can be satisfactorily relieved by a welding machine in a simple yet very positive manner irrespective of the welded joint being new or old and without the use of a large-sized special equipment.

What is claimed is:

1. A method for relieving residual stresses in a butt-welded joint between pipe sections, comprising: heating the outer surface of said butt-welded joint with a welding machine such that a weld heat input condition $q/t^2$; where q=heat input, and t=wall thickness of the pipe section; is higher than approximately 0.01, and a relative heat transfer coefficient $ht/\lambda$; where h=heat transfer coefficient between a coolant and the inner surface of the pipe section, and $\lambda$=thermal conductivity of the pipe section; is higher than approximately 2.

2. A method according to claim 1, wherein the weld heat is applied by the touch of the welding machine.

3. A method according to claim 1, wherein the weld heat is applied by build-up welding.

* * * * *

UNITED STATES PATENT AND TRADEMARK OFFICE
CERTIFICATE OF CORRECTION

PATENT NO. : 4,588,869
DATED : May 13, 1986
INVENTOR(S) : Kazuo Yoshida, et al

It is certified that error appears in the above-identified patent and that said Letters Patent are hereby corrected as shown below:

Column 4, line 51, "touch" to -- torch --.

Signed and Sealed this

Sixteenth Day of September 1986

[SEAL]

Attest:

DONALD J. QUIGG

Attesting Officer

Commissioner of Patents and Trademarks